July 23, 1940.  S. G. SAUNDERS ET AL  2,208,646
COATING MATERIAL RECOVERY PROCESS
Filed Oct. 15, 1937
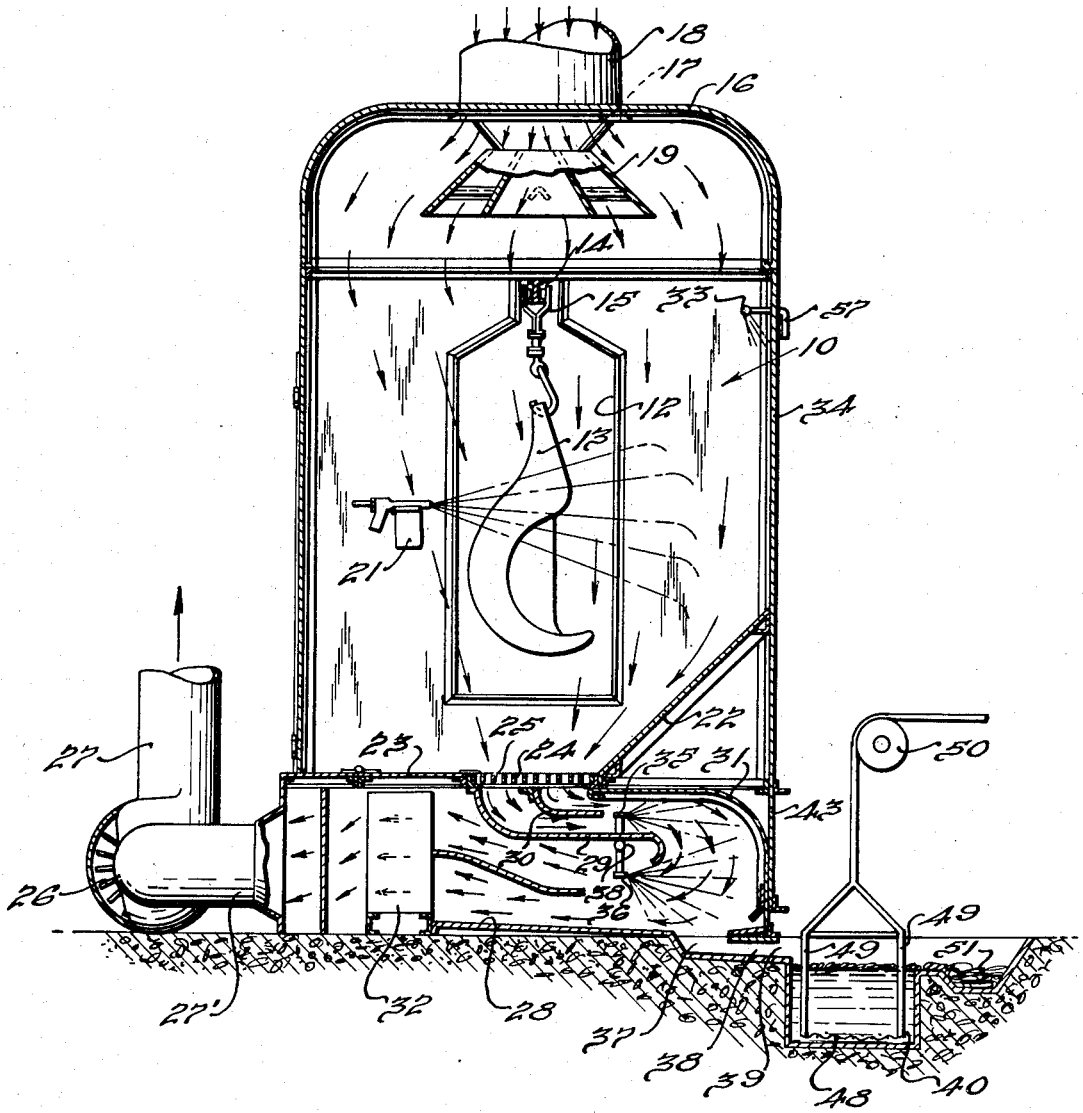
INVENTORS.
Seymour G. Saunders,
BY Harry Morrison.
ATTORNEYS.

/ Patented July 23, 1940

2,208,646

UNITED STATES PATENT OFFICE 2,208,646

COATING MATERIAL RECOVERY PROCESS

Seymour G. Saunders, Bloomfield Hills, and Harry Morrison, Detroit, Mich., assignors to Chrysler Corporation, Highland Park, Mich., a corporation of Delaware Application October 15, 1937, Serial No. 169,278

4 Claims. (Cl. 134—1)

This invention relates to an improved process and medium for recovering the non-volatile ingredients, commonly called solids, of excess sprayed surface coating materials and for preventing sticking of such material and their solids to the walls in which they are contained and it is a further development of the inventions described in United States Letters Patent No. 2,086,514 and No. 2,086,367.

More particularly the invention pertains to the recovery of solids from the atmosphere and from the walls of spray chambers in which paint, lacquer, natural and synthetic enamels and the like are being applied.

The term "solids" as used herein and as conventionally employed in the surface coating art refers to those portions of surface coating material which remain, either in their initial or chemically altered form, in a normally set deposit of such coating materials, including the non-volatile vehicle and pigment if the latter is present in the coating material.

One of the main objects of the invention is the provision of an improved recovery and adhesion preventing process and medium which will meet all the requirements set forth in said above mentioned patents and which in addition embodies the use of a water suspension of inert solids of low concentration.

Another object of the invention is the provision of a medium of this character which when applied to the walls of a spray booth or other surfaces in which surface coating material is contained, immediately provides on such surfaces a coating to which neither the coating material or its solids will adhere.

A further object of the invention is the provision of a medium of this character which renders the solids of coating materials precipitated and collected therein substantially non-adhesive to surfaces by which it is contained both during the recovery and subsequent handling stage of the process.

A still further object of the invention is the provision of an improved medium of this kind which is insoluble in any of the conventional surface coating material solvents and which is stable even at comparatively low temperatures in the absence of alkalinity or other characteristics which tend to injure the recovered products.

An additional object of the invention is the provision of a recovery medium of this character which is chemically compatible with the finished materials resulting from the recovery products as well as physically non-injurious thereto and which therefore need not be removed with that precision which is required when the presence of the recovery medium has a detrimental effect upon the recovered product.

Another object of the invention is the provision of a recovery medium of this kind which has a corrosion resisting action on the walls and other surfaces of a spray booth and associated recovery system with which it contacts.

Other objects of the invention are the provision of a medium of this kind which when applied to wall surfaces of a spray booth or to similar surfaces prevents the adhesion of excess sprayed coating material and solids thereto and facilitates the use of coating material solids precipitating liquids which normally are not capable of rendering the solids deposited thereby non-adhesive or otherwise prevent such solids from sticking to the surfaces by which they are contained; and to provide a material of this kind which can be used to advantage in the absence of the practice of recovery of solid materials to eliminate frequent cleaning and the resulting shut down of spray booths and spraying systems.

Additional objects of the invention are the provision of an improved recovery medium in which the solids of coating materials are insoluble and thus precipitate; to provide a recovery medium of this character in the presence of which conversion of the recovered product to an insoluble or other state not suitable for re-use is prevented and in which the solids are precipitated in a readily removable form and having the various ingredients thereof present in re-usable proportions; to provide a coating material solids precipitating medium which retains the resulting precipitate in such state that it can be directly redissolved in solvents of the same character as those from which it was previously recovered to form a coating material of the same order as that in which such solids had initially been included.

An illustrative embodiment of the invention is shown in the accompanying drawing, in which:

The figure is a diagrammatic vertical sectional view of a spray booth, illustrating a recovery process embodying the invention in which the improved recovery medium is adopted to be employed.

The improved recovery medium comprises a suspension of graphite in water and is preferably formed by mixing in water a sufficient quantity of "aquadag" to produce a .25% concentration of graphite. Aquadag is a readily available trade product comprising a colloidal suspension of graphite in water and has a concentration of substantially 22% graphite. Suspensions of graphite of diverse concentrations can be used in making the recovery medium; and the nature and size of the particles of carbon in the suspension may also vary within wide limits so long as they produce a stable suspension when used in low concentration in water. The concentration of the resulting recovery medium may also vary within wide limits, a .25% solution having been found to be satisfactory.

When the water used in making the recovery medium is substantially neutral, no preparatory treatment thereof is essential, but when water having an alkaline content is employed, it should be neutralized by the addition of acid preferably of sufficient amount to render the medium slightly on the acid side.

The foregoing type of solution may be used in spray booths of various constructions, the booth disclosed being illustrative of a workable recovery installation.

In the drawing is shown one form of spray chamber, generally designated by the numeral 10, with which the solid matter recovery apparatus may be used. The spraying chamber includes a casing having end walls 11 provided with registering openings 12 for accommodating the passage of articles 13 through the interior thereof. The articles are preferably conveyed through the spray chamber 10 by a conveyor which includes a rail 14 extending longitudinally of the chamber 10 and located at the upper extremities of the openings 12 thereof. The rail 14 is adapted to movably support a plurality of carriers 15 which are preferably attached to a continuous conveyor chain (not shown). The spray chamber 10 has a roof 16 in which is formed an air inlet opening 17 that communicates with a conduit 18 leading from an external or internal source of air. Disposed immediately below the air inlet 17 is an inverted frusto-conical deflector 19 having vanes 20 so constructed and arranged as to distribute the air current entering the inlet 17 throughout substantially all portions of the interior of the chamber 10. Provided at the lower longitudinal extremity of the spray chamber 10 on the side thereof opposite from the location at which the coating material is discharged upon the articles by a spray gun 21, or other suitable means, is an inclined baffle 22 which slopes downwardly and inwardly toward the central portion of the floor 23 of the chamber. An air outlet opening 24 is provided in the floor 23 adjacent the lower extremity of the baffle 22 for permitting the escape of the air admitted through the inlet 17. A grill 25 is disposed in the outlet opening 24 for the purpose of preventing the passage of articles or spray gun parts or other devices which may accidentally be dropped in the spraying chamber.

The air current is drawn through the inlet opening 17 and through the interior of the spraying chamber 10 by a blower 26 located externally of the spraying chamber and having a discharge conduit 27 which preferably leads to the atmosphere. The blower 26 includes an inlet conduit 27' which communicates with an air passage 28 disposed below the spraying chamber 10 and extending longitudinally thereof. The passage 28 leads from the outlet 24 of the spraying chamber 10 and is provided at its inlet end with curvilinear baffles 29 and 30 which direct the air passing through the outlet 24 rightwardly as viewed in Fig. 3 toward the right extremity of the passage 28. The lowermost baffle 29 extends rightwardly further than the baffle 30 but it terminates in spaced relation to the right extremity of the passage 28 so as to permit the air current to be reversed in direction of flow by a curvilinear baffle 31 located at the upper right extremity of the air passage. The air current flows around the right extremity of the lowermost baffle 29 and then continues in a leftward course toward the blower 26. An eliminator 32 is provided adjacent the outlet of the air passage 28 for removing any liquid such as spray coating material, or the precipitating agent introduced into the air current in the manner hereinafter set forth, before the air enters the blower 26 and discharge pipe 27.

The spray chamber 10 and the air passage 28 are provided with means for subjecting the air current circulated through the system to the action of an agent for precipitating the solids of the excess sprayed coating material which is carried by the air current. The precipitating agent preferably comprises liquid which not only washes or otherwise removes the sprayed coating material from the air current but which also precipitates the solid constituent thereof.

In the form of the invention illustrated, a discharge pipe 33 having a plurality of relatively small outlet orifices or other spray forming means, extends longitudinally of the spray chamber 10 and is located adjacent the back wall 34 thereof. The orifices, or spray devices of the discharge pipe 33 are so constructed and arranged as to direct the precipitating agent upon the internal surface of the rear wall 34 and to cause the liquid to flow downwardly thereon substantially in the form of a sheet or curtain. The liquid precipitating agent is then directed inwardly toward the outlet opening 24 by the inclined baffle 22 and ultimately flows through the outlet openings 24 along with the air current. That portion of the excess sprayed coating material which impinges upon the sheet or curtain of liquid precipitating agent discharged by the pipe 33 is removed from the air current and the solids thereof are precipitated from their solvent. Any portion of the air ladened with spray coating material which is not subjected to the washing and precipitated action of the agent discharged by the pipe 33 is thoroughly treated with precipitating agent by a pair of spray devices 35 and 36 located in the left end portion of the air passage 28. The uppermost spray device 35 includes a plurality of outlet orifices or spray nozzles which discharge the precipitating agent in the direction of travel of the air current flowing through the section of the passage 28 above the baffle 29, and the spray device 26 likewise includes a plurality of orifices or discharge nozzles which spray precipitating agent in a direction opposite to the direction of flow of the air current through that portion of the air passage 26 located below the baffle 29. In this manner the precipitating agent is applied to the air current of the passage 28 at the location therein where the air current is reversed in the direction of movement.

Provided in the lower wall of the air passage 28 is an outlet 37 for accommodating the flow of the precipitating agent and solids of the spray coating material therefrom. The outlet 37 communicates with an elongated passageway or conduit 38 having a discharge outlet 39 which communicates with a sump 40, as illustrated.

The recovered solids from many sprayed surface coating materials will sink to the bottom of the sump in the form of a sludge and in this case the solids may be conveniently removed from the sump 40 by the aid of a liquid pervious screen 48 which is preferably disposed at the bottom of each sump 40. Cables 49 are attached to the screen 48 and preferably extended over a pulley 50 so as to enable convenient vertical movement of the screen 48 from the interior of its sump when it is desired to displace the precipitated solids therefrom.

The solids of some sprayed surface coating materials, are found to float on the top of the liquid, in the form of a scum or sludge of soft cheese or liver-like consistency, the particles of solids being cohered together in masses. The precipitate may be conveniently removed from the sump 40 by scraping the floating scum-like substance so formed into a trough 51 from which it may be conveniently removed for further operation in accordance with the recovery process.

The precipitated solids obtained in either of the foregoing ways include the non-volatile vehicle dispersed coloring matter or pigment if any and substantially all other ingredients which comprise the solids of surface coating materials. In this recovery product, the pigment if present is thoroughly dispersed in the non-volatile vehicle in substantially that condition produced by the original grinding operations employed in the initial manufacture of the coating material. These recovered products are then separated from the precipitating agent, preferably by initially removing the main portion of the latter in a press or by allowing the sludge to drain. For some purposes more complete removal of the precipitating agent may be desirable and in this event the precipitating agent is preferably washed out or extracted, with suitable solvent therefor which will not dissolve or otherwise seriously disturb the condition of the recovered solids. The presence, however, of relatively small amounts of the graphite of the precipitating medium are perfectly compatible with the recovered coating material solids and can be allowed to remain therein. The thus reconditioned recovered material may then be dissolved in a solvent of the same character as that from which it had previously been separated in order to produce surface coating material which is otherwise wasted.

Irrespective of the saving resulting from the recovery of excess sprayed coating materials, the use of precipitating agents in the foregoing manner and in which the solids of the coating material are not soluble or rendered gummy, is of substantial value. The elimination of the nuisance problems involved in the discharging of air from spray booths into atmosphere in densely inhabited regions, as well as the saving in cleaning of the apparatus and removing from the walls thereof, deposited solid and semi-solid accumulations represent a material saving in spray booth operation even though no attempt is made to reuse the recovered coating materials.

The precipitating medium may be withdrawn periodically from the sump 40, filtered if desired and recirculated and reused.

The sludge recovered by precipitation with the above mentioned medium may be separated from the main bulk of the precipitating medium and directly dissolved in a suitable coating material solvent and the resulting mixture of solution may be centrifuged in a cream type separator, for example, to obtain the recovered coating material.

In some coating material spraying applications, the excess sprayed coating material can be economically recovered by treating the walls of the spray booth with which the excess spray contacts with a dispersion of graphite in water of sufficient concentration to have a substantial lasting adhesion preventing action. Then by washing such walls, either periodically or continuously with the spraying operation, with water the deposited material may be flushed into a sump and collected and removed in the foregoing manner. When the wall surfaces are thus coated, the solids of excess sprayed coating material may be precipitated and conveyed in a medium, such as water, which would not alone prevent adhesion of the recovered product to the surface with which it contacted. Coating of the spray booth walls with a suspension of graphite of this kind may also be relied upon to prevent adhesion of excess sprayed coating materials to such surfaces and to simplify cleaning thereof in instances where recovery is not practiced.

Although but several specific embodiments of the invention are herein shown and described, it will be understood that various changes in the steps of the process and in the materials and apparatus employed may be made without departing from the spirit of the invention.

What we claim is:

1. The process of recovering solids of excess sprayed coating materials which comprises precipitating said solids by subjecting said excess sprayed coating material to the solids precipitating action of a flowing liquid stream comprising a water suspension of colloidal graphite, and separating said precipitate from said water suspension.

2. The process of recovering solids of excess sprayed coating materials which comprises precipitating said solids by subjecting said excess sprayed coating material to treatment with a water suspension of colloidal graphite, and dissolving the resulting solids in a coating material solvent.

3. The process of recovering solids of excess sprayed coating materials which comprises precipitating said solids by subjecting said excess sprayed coating material to treatment with a water suspension of colloidal graphite; separating said precipitate from the main bulk of said water suspension, dissolving the resulting solids in a coating materials solvent, and separating the dissolved solids from residual quantities of said water suspension by centrifuging the mixture thereof.

4. The process of recovering solids of excess sprayed coating materials which comprises applying on the surfaces within which said excess sprayed coating material and solids thereof are contained and with which they contact a water suspension of finely divided graphite to prevent adhesion of said excess sprayed coating material thereto, separating the resulting precipitate from said medium, and dissolving the latter in a coating material solvent.

SEYMOUR G. SAUNDERS.
HARRY MORRISON.